March 27, 1956
H. C. KRONE ET AL
2,739,778
SPRING COUNTERBALANCED SWING JOINT
SUPPORTED CONDUIT OR LIKE ARM
Filed Nov. 9, 1953
2 Sheets-Sheet 1
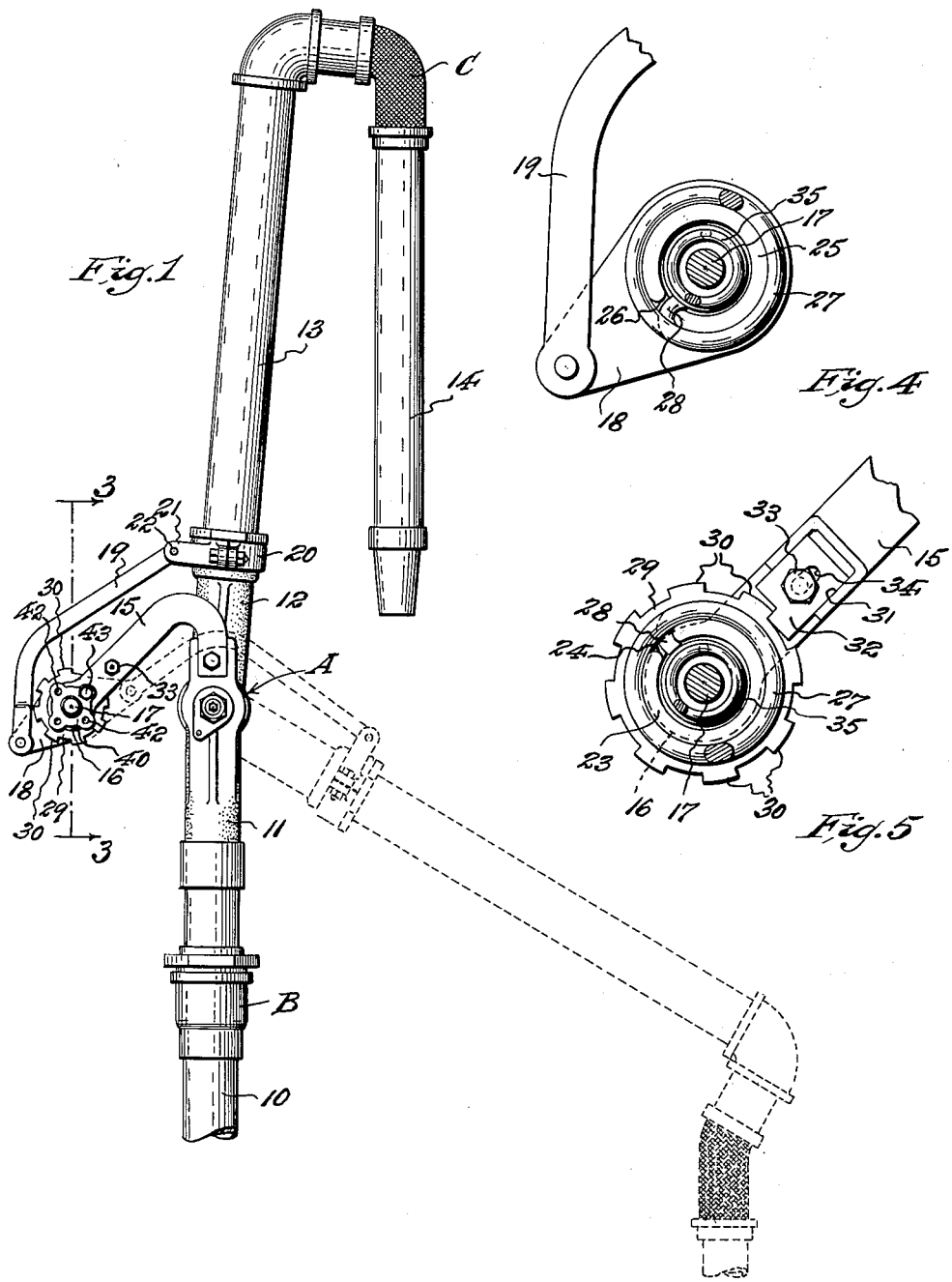
INVENTORS:
Howard C. Krone, William Meyer
BY Richard Slawinski.
George D. Richards
Attorney

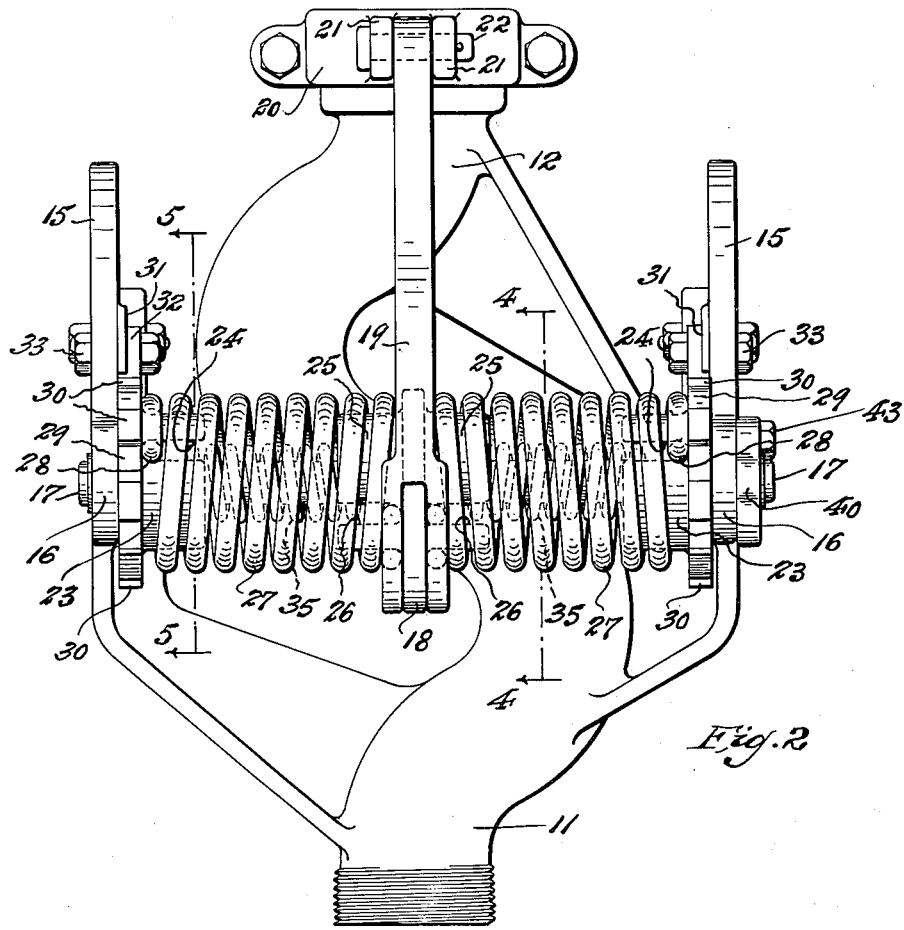
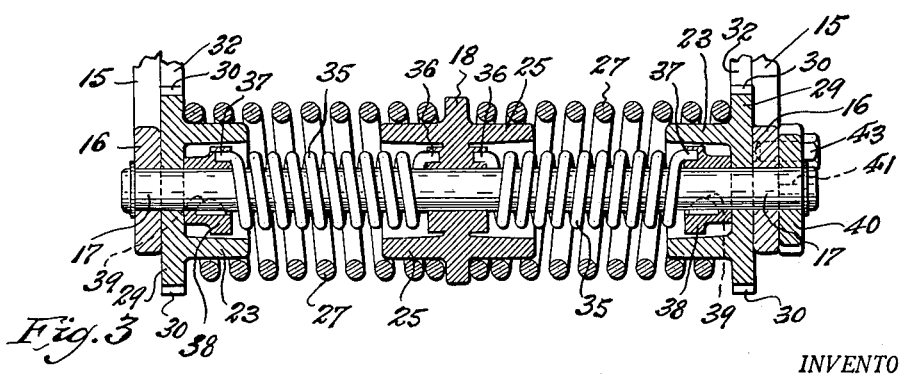

United States Patent Office 2,739,778
Patented Mar. 27, 1956

2,739,778

SPRING COUNTERBALANCED SWING JOINT SUPPORTED CONDUIT OR LIKE ARM

Howard C. Krone, Short Hills, William Meyer, East Orange, and Richard Slawinski, Union, N. J., assignors to Wheaton Brass Works, Union, N. J., a corporation of New Jersey Application November 9, 1953, Serial No. 391,078

8 Claims. (Cl. 248—292)

This invention relates to improvements in loading conduit systems for delivering fluids from supply sources, and especially for loading oil, gasolene or other liquids into tank trucks, railroad tank cars, aeroplane storage tanks or other containers in which such liquids are transported or shipped; and the invention has reference, more particularly, to a swing joint supported loading or discharge arm adapted to be swung up and down to optionally dispose the same in out of service position or in service position.

This invention has for an object to provide, in combination with the swingable discharge arm of a loading conduit system or similar structure, a spring counterbalancing means for said swingable arm operative to normally return the same to and hold the same in an upswung out of service position, and further including associated buffer spring means to arrest upswinging movement of said arm, whereby to bring the same to normal upswung out of service position without shock.

A further object of this invention is to provide respective manipulatable means whereby to regulate the tensions of respective counterbalancing and buffer spring means.

The above and other objects will be understood from a reading of the following detailed description of the invention in connection with the accompanying drawings, in which:

Fig. 1 is a side elevational view of a loading conduit system, the swingable discharge arm of which is equipped with the counterbalancing and buffer spring means according to this invention, said discharge arm being shown by full lines in its up-swung out of service position, and by broken lines in its down-swung service position; Fig. 2 is a fragmentary elevational view of the same, viewed from the left of Fig. 1, this view being drawn on an enlarged scale; and Fig. 3 is a fragmentary vertical sectional view, taken on line 3—3 in Fig. 1, and also drawn on an enlarged scale.

Fig. 4 is a fragmentary cross sectional view, taken on line 4—4 in Fig. 2; and Fig. 5 is another cross sectional view, taken on line 5—5 in Fig. 2.

Similar characters of reference are employed in the above described views, to indicate corresponding parts.

By way of illustration, this invention is shown as embodied in a loading conduit system of the general kind shown in prior United States Letters Patent No. 2,319,068, dated May 11, 1943, although it will be understood that the invention can be embodied in any other type of loading system or in any other apparatus which includes a swingable arm.

Referring to the drawings, the reference character 10 indicates a stand pipe of a loading conduit system which leads from a source of liquid or other fluids to be discharged, as e. g. from a storage tank for gasolene, oil or other fluid (not shown). The liquid or fluid may be delivered to and through the stand pipe 10 by gravity or by pump pressure according to the type of tank and its location relative to the stand pipe, and suitable shut-off valve means (not shown) may be provided for controlling delivery of liquid or fluid to and through the loading conduit system.

Connected to and in communication with the stand pipe 10 is a swing joint A, the stationary receiving end portion 11 of which is preferably connected to said stand pipe by a swivel joint B. To the movable discharge end portion 12 of the swing joint A is connected a discharge arm 13. To the free end of the discharge arm 13 is connected, preferably by a suitable articulated or flexible connection C, a drop pipe 14. If desired, the free end of the drop pipe 14 may be equipped with any suitable form of manipulatable control or faucet valve (not shown), by which flow of liquid or other fluid from the discharge arm and drop pipe can be controlled.

Suitably supported in the fixed connection with the stationary end portion 11 of the swing joint A are laterally spaced apart and rearwardly projecting bracket arms 15. Supported by said bracket arms 15, so as to extend between the free end portions 16 thereof, is a transverse shaft 17. Pivotally supported by said shaft 17, intermediate the free end portions 16 of the bracket arms 15, is a rearwardly projecting lever arm 18. Pivotally coupled to the free end of said lever arm 18 is the rearward end portion of a link bar 19. Suitably affixed to the outer extremity of the movable discharge end portion 12 of the swing joint A is a collar 20 from which extend rearwardly projecting, spaced apart lugs or ears 21, to which the forward end portion of the link bar 19 is pivotally coupled by a pivoting pin 22, which is supported by said lugs or ears 21.

Supported by the pivoting shaft 17, respectively contiguous to the inner faces of respective free end portions 16 of the bracket arms 15, are inwardly projecting hollow anchoring hub members 23, the walls of which are provided with suitably located indenting slots or openings 24.

Rotatable about the pivoting shaft with the lever arm 18, from opposite faces of which they respectively project, preferably as integral parts thereof, are hollow coupling hub members 25, the walls of which are provided with suitably located indenting slots or openings 26.

Extending between each anchoring hub member 23 and the coupling hub member 25 opposed thereto is a relatively heavy, spirally convolute counterbalancing spring 27, into the respective end portions of which said respective hub members extend. Said counterbalancing springs 27 terminate at their respective ends in coupling hook elements 28 which are respectively engaged through the slots or openings 24 and 26 of the hub members 23 and 25, whereby to couple said spring ends to said respective hub members. One said counterbalancing spring is formed with left hand and the other with right hand helical turns, so that when the coupling hub members 25, to which inner ends of said springs are attached, are rotated clockwise, by corresponding clockwise swinging movement of the lever arm 18 under the pull of the link bar 19, said springs will be twisted or wound to a condition of strong torsional tension which reacts in counterclockwise direction.

The anchoring hub members 23 can be rotatably adjusted about the shaft 17, whereby to predetermine a desired normal or relaxed tension of the counterbalancing springs 27, means being provided to releaseably retain said anchoring hub members in positions to which they have been adjusted. To permit such adjustment and holding of the anchoring hub members 23, each thereof is provided with a base flange 29 having circumferentially spaced stop lugs 30 around its periphery. Slidably supported upon the inner face of each bracket arm 15, by a guide frame means 31 with which the latter is provided, is a movable check piece 32, which can be made fast to the bracket arm by a lock bolt 33 arranged to pass through a longitudinal slot 34 in the check piece and then to screw into the bracket arm. To adjust an anchoring hub member 23 to normally tension the associated counterbalancing spring 27, the cooperative check piece 32 is released and drawn back to disengage a stop lug 30 on the base flange 29 of the anchoring hub member. When the anchoring hub member is thus freed from the restraint of the check piece, the same can be rotated counterclockwise about the shaft 17 by means of a suitable tool, such as a spanner wrench engageable with a stop lug 30. Rotation of the anchoring hub member in counterclockwise direction will twist or wind the counterbalancing spring 27 to a desired normal tension, whereupon said spring can be held in resultant normally tensioned condition by returning the check piece 32 into holding relation to the anchoring hub member by engagement thereof with a selected stop lug 30 on the flange 29 of the latter.

Mounted around the shaft 17, within and concentric to the counterbalancing spring means, is a buffer spring means. This buffer spring means comprises relatively light spirally convolute buffer springs 35 which extend outwardly from the lever arm 18 in opposite directions, with their inner ends 36 fixedly attached to said lever arm. The outer ends 37 of said buffer springs 35 are fixedly attached to anchoring collars 38 which are carried by the shaft 17, and which are suitably secured to the latter, as by keys 39. One said buffer spring is formed with right hand and the other with left hand helical turns, so that when the lever arm 18, to which the inner ends 36 of said buffer springs are attached, is swung in clockwise direction under the pull of the link bar 19, said buffer springs will be twisted or wound to a condition of relaxed tension, but, when the lever arm 18 is swung in counterclockwise direction by tensional torque of the counterbalancing springs 27, will be twisted or wound to a condition of strong torsional tension. It will therefore be understood that the tension of the buffer springs is decreased when the tension of the counterbalancing springs 27 is increased, and, vice versa, the tension of the buffer springs will increase as the tension of said counterbalancing springs decreases.

Means is provided for regulating the effective buffer or shock cushioning tension of the buffer springs 35. This means comprises a knob plate 40 which is affixed by a key 41, or other suitable fastening means, to an end of the shaft 17, so as to be disposed contiguous to the outer face of an end portion 16 of a bracket arm 15. Said knob plate 40 is provided with a plurality of circumferentially spaced openings 42, through a selected one of which is passed a lock screw 43 adapted to screw into said bracket arm 15, thus holding the knob plate, shaft 17 and anchoring collars 38 against rotation. Since the anchoring collars 38 are fixed on the shaft 17 so as to turn therewith, to regulate the effective buffer or shock cushioning tension of the buffer springs 35, it is merely necessary to remove the lock screw 43 and then turn the knob plate 40 in clockwise direction, whereby to rotate the shaft 17 and anchoring collars 38 so as to twist or wind said buffer springs to desired tension. Desired tension of the buffer springs having been attained, said springs are held in such tensional condition by passing the lock screw 43 through an appropriate opening 42 of the knob plate 40, and thereupon screwing the same into the adjacent bracket arm 15, whereby to lock the shaft 17 and anchoring collars 38 against rotation.

In operation, when the discharge arm 13 and drop pipe 14 of the loading conduit system are down swung to service position, accompanying down swinging movement is imparted to the movable end portion 12 of the swing joint A, and through the latter a forward pull is exerted upon the link bar 19. Under this forward pull of the link bar 19, the lever arm 18 is caused to swing in clockwise direction about the pivoting shaft 17, thus rotating the coupling hub members 25 in clockwise direction, and thereby twisting or winding the counterbalancing springs 27 to a condition of stored strong torsional tension. At the same time, the buffer springs 35 will be twisted or wound to a condition of relaxed tension. Under these conditions, after dispensing use of the down swung discharge arm 13 and drop pipe 14 is completed, the same are released for return to out of service position. When so released, the stored torsional tension of the counterbalancing springs 27 will cause counterclockwise rotation of the lever arm 18, whereby to exert, through the link bar 19, an upswinging rearward pull upon the movable end portion 12 of the swing joint A which is operative to upswing the discharge arm 13 and drop pipe 14 back to normal out of service position. The counterclockwise rotation of the lever arm 18, under the above stated conditions, operates to twist or wind the relaxed buffer springs 35 back to a normal condition of stored torsional tension, so that, as the discharge arm 13 and drop pipe 14 approach normal up swung out of service position, the tensional torque exercised by the buffer springs 35 counters and overcomes the decreased opposite tensional torque exercised by the counterbalancing springs 27, whereby to arrest up swinging movement of said discharge arm 13 and drop pipe 14 in such manner as to cushion these parts, and the swing joint A from which they extend, against shock as they resume out of service position.

Having now described an illustrative embodiment of our invention, we claim:

1. In combination with a swing joint supported arm wherein the supporting swing joint includes a stationary member, means to counterbalance said arm for normal disposition in an up swung out of service position comprising laterally spaced bracket arms rearwardly extending from the stationary member of the swing joint, a normally non-rotatable pivot shaft supported by and between said bracket arms in offset parallel relation to the pivotal axis of the swing joint, a lever arm pivotally mounted on said shaft, a link bar interconnecting said lever arm with said swing joint supported arm, a counterbalancing helical spring, a normally fixed anchoring hub member around said shaft to which an end of said spring is secured, the opposite end of said spring being secured to said lever arm, said spring being adapted to be wound to a condition of stored torsional tension by rotation of said lever arm under pull of said link bar induced by down swinging movement of the swing joint supported arm to service position, and a helical buffer spring, an anchoring collar fixed on said shaft to which an end of said buffer spring is secured with the opposite end thereof attached to said lever arm, said buffer spring being adapted to be wound to a condition of torsional tension by reverse rotation of the lever arm induced by tensional torque of the counterbalancing spring, whereby to counter and overcome the tensional torque of the latter so as to cushion against shock the return of the swing joint supported arm to out of service position.

2. The combination defined by claim 1 wherein the anchoring hub member is rotatably adjustable to predetermine initial tension of the helical counterbalancing spring, said anchoring hub member and an adjacent bracket arm being provided with cooperative means to releasably hold the former in selected adjusted position.

3. The combination defined by claim 1 wherein the pivot shaft with an anchoring collar is rotatably adjustable to predetermine initial tension of the helical buffer spring, means being provided for releasably holding said shaft and anchoring collar in selected adjusted position.

4. The combination defined by claim 1 wherein the anchoring hub member is rotatably adjustable to predetermine initial tension of the helical counterbalancing spring, said anchoring hub member and an adjacent bracket arm being provided with cooperative means to releasably hold the former in selected adjusted position, and wherein the pivot shaft with an anchoring collar is rotatably adjustable to predetermine initial tension of the helical buffer spring, means being provided for releasably holding said shaft and anchoring collar in selected adjusted position.

5. The combination with a swing joint supported arm wherein the supporting swing joint includes a stationary member, means to counterbalance said arm for normal disposition in an up swung out of service position comprising laterally spaced bracket arms rearwardly extending from the stationary member of the swing joint, a normally non-rotative pivot shaft supported by and between said bracket arms in offset parallel relation to the pivotal axis of the swing joint, a lever arm pivotally mounted on said shaft midway between said bracket arms, a link bar interconnecting said lever arm with said swing joint supported arm, a normally fixed anchoring hub member concentric to the pivot shaft adjacent to each bracket arm, said lever arm having coupling hub members projecting from opposite sides thereof concentric to the pivot shaft, a pair of helical counterbalancing springs concentric to the pivot shaft with their outer ends anchored respectively to the respective anchoring hub members and their inner ends respectively attached to the respective coupling hub members of said lever arm, said counterbalancing springs being adapted to be wound to a condition of stored torsional tension by rotation of said lever arm under pull of said link bar induced by down swinging movement of the swing joint supported arm to service position, anchoring collars keyed to the pivot shaft adjacent opposite end portions thereof, a pair of helical buffer springs concentric to and intermediate said pivot shaft and the counterbalancing springs with their outer ends respectively anchored to said respective anchoring collars and their inner ends respectively attached to opposite sides of the lever arm, said buffer springs being adapted to be wound to a condition of torsional tension by reverse rotation of the lever arm induced by tensional torque of the counterbalancing springs, whereby to counter and overcome the tensional torque of the latter so as to cushion against shock the return of the swing joint supported arm to out of service position.

6. The combination defined by claim 5 wherein the anchoring hub members are rotatably adjustable about the pivot shaft to predetermine initial tension of the counterbalancing springs, said anchoring hub members and the adjacent bracket arms being provided with cooperative detent means to releasably hold the former in selected adjusted positions.

7. The combination defined by claim 5 wherein the pivot shaft can be turned to rotatably adjust the anchoring collars carried thereby to predetermine initial tension of the buffer springs, a knob plate fixed on said shaft for turning the same, and said knob plate and a bracket arm adjacent thereto having cooperative means to releasably hold the shaft and anchoring collars in selected adjusted position.

8. The combination defined by claim 5 wherein the anchoring hub members are rotatably adjustable about the pivot shaft to predetermine initial tension of the counterbalancing springs, said anchoring hub members and the adjacent bracket arms having cooperative detent means to releasably hold the former in selected adjusted positions, and wherein the pivot shaft can be turned to rotatably adjust the anchoring collars carried thereby to predetermine initial tension of the buffer springs, a knob plate fixed on said shaft for turning the same, and said knob plate and a bracket arm adjacent thereto having cooperative means to releasably hold the shaft and anchoring collars in selected adjusted position.

References Cited in the file of this patent

UNITED STATES PATENTS

| 884,105 | Ryerson et al. | Apr. 7, 1908 |
| 2,200,518 | Perbal | May 14, 1940 |
| 2,299,251 | Perbal | Oct. 20, 1942 |

FOREIGN PATENTS

| 772,052 | France | of 1934 |